(12) United States Patent
Lessi

(10) Patent No.: US 7,144,446 B1
(45) Date of Patent: Dec. 5, 2006

(54) ON-BOARD ADSORBER AND METHOD FOR PRODUCING AND DELIVERING OXYGEN

(75) Inventor: Stéphane Lessi, Grenoble (FR)

(73) Assignee: L'Air Liquide, Société Anonyme à Directoire et Consell de Surveillance pour l'Étude et l'Exploitation des Procédés Georges Claude, Paris (FR)

( * ) Notice: Subject to any disclaimer, the term of this patent is extended or adjusted under 35 U.S.C. 154(b) by 281 days.

(21) Appl. No.: 10/794,211

(22) Filed: Mar. 5, 2004

(30) Foreign Application Priority Data

Mar. 5, 2003 (FR) .................................. 03 02708

(51) Int. Cl.
*B01D 53/02* (2006.01)
(52) U.S. Cl. ................ 95/96; 95/130; 96/108
(58) Field of Classification Search ............ 95/96–103, 95/130; 96/108
See application file for complete search history.

(56) References Cited

U.S. PATENT DOCUMENTS

| | | | |
|---|---|---|---|
| 4,191,891 A | * | 3/1980 | Amtmann et al. .......... 378/109 |
| 4,406,675 A | * | 9/1983 | Dangieri et al. ............... 95/26 |
| 4,838,901 A | * | 6/1989 | Schmidt et al. ................ 95/90 |
| 6,068,678 A | * | 5/2000 | Labasque et al. .............. 95/96 |

FOREIGN PATENT DOCUMENTS

| | | |
|---|---|---|
| EP | 0 884 086 A | 12/1998 |
| GB | 2 013 101 A | 8/1979 |

OTHER PUBLICATIONS

French Search Report for FR 0302708.

* cited by examiner

*Primary Examiner*—Robert A. Hopkins
(74) *Attorney, Agent, or Firm*—Christopher J. Cronin

(57) ABSTRACT

An on-board adsorber and method for delivering oxygen on an aircraft that has a squat and compact configuration with a mass of adsorbent with a height to diameter ratio ranging from 0.8 and 2, and the ratio of the cross-sectional area S of the mass of adsorbent to the cross-sectional area S of the central duct ranges from 80 to 110.

18 Claims, 1 Drawing Sheet

ON-BOARD ADSORBER AND METHOD FOR PRODUCING AND DELIVERING OXYGEN

This application claims the benefit of priority under 35 U.S.C. § 119 (a) and (b) 1 to French Application No. 0302708, filed Mar. 5, 2003, the entire contents of which are incorporated herein by reference.

BACKGROUND OF THE INVENTION

1. Field of the Invention

The present invention relates to adsorbers for the production and delivery of oxygen to passengers of an aircraft, comprising, in a cylindrical casing and around a central gas duct coaxial with the casing, a mass of adsorbent that preferentially adsorbs nitrogen.

2. Related Art

On-board oxygen generators (OBOGS) of the PSA type are becoming increasingly important in civil aircraft, especially in large-capacity aircraft. Compared with oxygen generators for a conventional fighter plane, the generators for transport planes must treat large volumes of air and hence, also use large quantities of adsorbent, representing a major fraction of the total mass of the system.

There is therefore a need to optimize the design of adsorbers in order to minimize the mass of adsorbent, without reducing the performance.

SUMMARY OF THE INVENTION

The subject of the present invention is an adsorber of the abovementioned type in which the mass of adsorbent has a mean axial dimension h of greater than 25 cm and an outside diameter $\phi$ such that $h/\phi$ is between 0.8 and 2.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
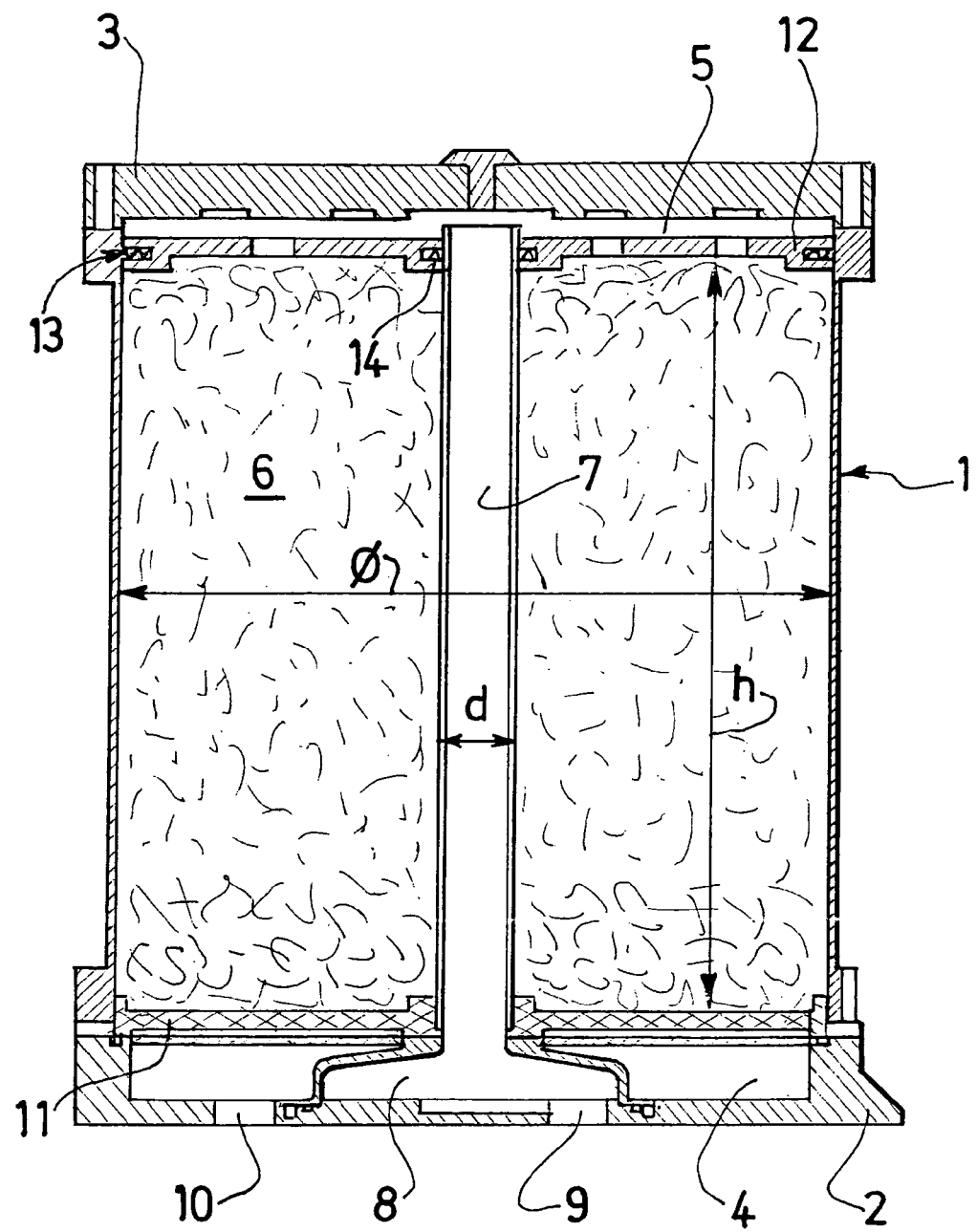
FIG. 1 illustrates the main components of the adsorber.

According to more particular characteristics of the invention, $h/\phi$ is between 0.8 and 1.5, advantageously between 0.95 and 1.2.

The ratio S/s of the cross-sectional area S of the mass of adsorbent to the cross-sectional area s of the central duct is between 80 and 110, advantageously between 95 and 105. S equals $\pi(\frac{1}{2}\varnothing)^2$ while s equals $\pi(\frac{1}{2}d)^2$.

The adsorbent contains predominantly a fine zeolite with a particle size of less than 0.8 mm, advantageously between 0.6 and 0.7 mm, typically of the LiLSX type.

The subject of the present invention is also a method of using an oxygen generator comprising two adsorbers as defined above, operating alternately in a PSA cycle, in which the cycle time is less than 6 seconds, advantageously less than 5 seconds, the output of oxygen-enriched mixture (typically in an oxygen concentration of greater than 80%) being about 300 liters per minute with an output pressure of greater than 2 bar relative (30 psig).

The adsorber architecture and the operating method according to the invention make it possible to optimize the effective flow area in the adsorbent by reducing the length of sieve through which the gas flows, this optimization of the mass of adsorbent making it possible—apart from reducing costs—to reduce the total number of adsorbers needed to produce large volumes of an oxygen-enriched mixture, which makes it possible to considerably reduce the risk of a breakdown, facilitate maintenance and make it easier for it to fit into the confined spaces on the aircraft.

The present invention also relates to the use of such an adsorber in a system for delivering oxygen to passengers on an aircraft, in particular a large-capacity civil aircraft, and to such an aircraft incorporating at least one such adsorber.

Other features and advantages of the present invention will emerge from the following description of one embodiment, given by way of illustration but not implying any limitation, in conjunction with the appended drawing in which:

the single FIGURE is a schematic view, but drawn to scale, in longitudinal cross section, of one embodiment of an adsorber according to the invention more particularly suitable for large-capacity civil aircraft.

FIG. 1 shows the main constituent elements of a PSA adsorber, namely a peripheral shell or casing 1 closed at its ends by flanges 2 and 3 that define, respectively, fluid distribution chambers 4 and 5 axially on either side of a mass of adsorbent 6 which is placed in the shell 1 and through which a duct 7 runs centrally, the said duct being coaxial with the shell 1 and connecting the upper chamber 5 to a lower plenum 8 based centrally in the lower chamber 4 and communicating with external circuitry via a passage 9 formed in the lower flange 2. The lower chamber 4 communicates, via at least one passage 10 also formed in the lower flange 2, with an external line so as to group together the inputs/outputs of the adsorber at one and the same end of the latter. The adsorber is designed to be installed, typically in pairs, in a PSA system for separating oxygen from air, in order to supply a circuit for delivering oxygen to the passengers of a transporter aircraft.

The annular mass of adsorbent 6 is typically held in place between a gas-permeable bottom wall 11, typically made of a sintered metal, and an upper porous compressing wall 12, for example also made of sintered metal or of a fine mesh, held in position by bearing against the upper end of the mass of adsorbent 6 via frictive lip seals 13 and 14 that cooperate with the internal face of the shell 1 and with the external surface of the central duct 7, respectively.

According to one aspect of the invention, the central duct 7 has a small cross section $\underline{s}$ in order to allow the mass of adsorbent to keep a maximum cross-sectional area $\underline{S}$. In addition, to optimize the head losses while maintaining a high productivity of pure oxygen (greater than 7 l/min/kg-sieve, typically greater than 8.5 l/min/kg-sieve), the (axial) height $\underline{h}$ of the mass of adsorbent, that is to say the length along which the gas flows, is chosen so that $h/\phi$ is within 0.8 and 2, advantageously between 0.8 and 1.5 and preferably between 0.95 and 1.2, $\phi$ being the inside diameter of the shell 1.

EXAMPLES

In the example shown, with a high-performance adsorbent of the LiLSX zeolite type, lithium-exchanged to more than 88%, as described in document FR-A-2 765 491 in the name of the Applicant, and having a particle size of less than 0.8 mm, typically between 0.6 and 0.7 mm, with a height $\underline{h}$ of about 30 cm, a diameter $\phi$ also of about 30 cm, a diameter $\underline{d}$ of 30 mm, an adsorber having a low optimized mass of adsorbent of about 14 kg is produced which, for a gas output of 300 l/min at a maximum output pressure of 2 bar relative, gives, in a PSA cycle of about 4.5 seconds with two identical adsorbers operating alternately, a pure oxygen productivity of up to 8.9 l/min/kg-sieve.

Although the invention has been described in the case of one particular embodiment, it is not limited thereto but is capable of modifications and variations that will become apparent to those skilled in the art within the context of the claims appended hereto.

The invention claimed is:

1. An adsorbent apparatus for producing and delivering oxygen on-board to passengers of an aircraft, comprising an adsorbent mass in a cylindrical casing and around a central gas duct coaxial with said cylindrical casing, wherein said absorbent mass preferentially adsorbs nitrogen, and wherein:

said absorbent mass has a mean axial dimension h greater than about 25 cm and an outside diameter $\phi$, such that the ratio of $h/\phi$ is in the range of from about 0.8 to about 2;

said adsorbent mass has a cross-sectional area S;

said gas duct has a cross-sectional area s; and a ratio of S/s is in a range of from about 80 to about 110.

2. The apparatus according to claim 1, wherein said $h/\phi$ is in the range of from about 0.8 to about 1.5.

3. The apparatus according to claim 2, wherein said range is from about 0.95 to about 1.2.

4. The apparatus according to claim 1, wherein said ratio S/s is in a range of from about 95 to about 105.

5. The apparatus according to claim 1, wherein said adsorbent mass comprises a zeolite.

6. The apparatus according to claim 5, wherein the particle size of said zeolite is less than about 0.8 mm.

7. The apparatus according to claim 6, wherein said size is in the range of from about 0.6 to about 0.7 mm.

8. The apparatus according to claim 5, wherein said zeolite is lithium-exchanged to more than about 88%.

9. The adsorbent apparatus of claim 1, further comprising:

a semipermeable membrane extending between said duct and a lower end of said casing and covering a lower end of said adsorbent mass; and a first flange covering, and extending from said lower end of said casing, said first flange having a first passage formed therethrough and fluidly communicating with said duct, said first flange further having a second passage formed therethrough and fluidly communicating with said semipermeable membrane.

10. A method of oxygen generation comprising two adsorbers operating alternately in a PSA cycle, wherein at least one absorber comprises an adsorbent mass in a cylindrical casing and around a central gas duct coaxial with said cylindrical casing, wherein said absorbent mass preferentially adsorbs nitrogen, and wherein said absorbent mass has a mean axial dimension h greater than about 25 cm and an outside diameter $\phi$, such that the ratio of $h/\phi$ is in the range of from about 0.8 to about 2, wherein the cycle time is less than about 6 seconds, wherein the gas output is about 300 l/min for a gas output pressure of greater than 30 psig, wherein said adsorbent mass has a cross-sectional area S, wherein said gas duct has a cross-sectional area s, and a ratio of S/s is in the range of from about 80 to about 110.

11. The method according to claim 10, wherein said cycle time is less than about 5 seconds.

12. The method according to claim 10, wherein said method delivers oxygen to an aircraft.

13. The method according to claim 10, wherein said $h/\phi$ is in the range of from about 0.8 to about 1.5.

14. The method according to claim 13, wherein said range is from about 0.95 to about 1.2.

15. The method according to claim 10, wherein said ratio S/s is in a range of from about 95 to about 105.

16. The method according to claim 15, wherein said adsorbent mass comprises a zeolite.

17. The method according to claim 16, wherein the particle size of said zeolite is less than about 0.8 mm.

18. The method according to claim 16, wherein said zeolite is lithium-exchanged to more than about 88%.

* * * * *